(12) United States Patent
Mahurin et al.

(10) Patent No.: US 11,669,273 B2
(45) Date of Patent: Jun. 6, 2023

(54) MEMORY ACCESS MANAGEMENT

(71) Applicant: QUALCOMM Incorporated, San Diego, CA (US)

(72) Inventors: Eric Wayne Mahurin, Austin, TX (US); Hitesh Kumar Gupta, Santa Clara, CA (US); Ahmad Radaideh, Austin, TX (US)

(73) Assignee: Qualcomm Incorporated, San Diego, CA (US)

( * ) Notice: Subject to any disclaimer, the term of this patent is extended or adjusted under 35 U.S.C. 154(b) by 78 days.

(21) Appl. No.: 17/166,263

(22) Filed: Feb. 3, 2021

(65) Prior Publication Data
US 2021/0240394 A1    Aug. 5, 2021

Related U.S. Application Data

(60) Provisional application No. 62/969,598, filed on Feb. 3, 2020.

(51) Int. Cl.
*G06F 3/06*      (2006.01)

(52) U.S. Cl.
CPC .......... *G06F 3/0659* (2013.01); *G06F 3/0622* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 2014/0181476 A1* | 6/2014 | Srinivasan | G06F 9/3838 |
| | | | 712/208 |
| 2017/0060579 A1* | 3/2017 | Vincent | G06F 9/3838 |
| 2018/0232234 A1* | 8/2018 | Alexander | G06F 9/3838 |

OTHER PUBLICATIONS

Shiva S.G., "Computer Organization, Design and Architecture," 5th edition, Control Unit Enhancement, Section 11.3.4.1 CDC 6600 Scoreboard, CRC press, 2014, pp. 1-5.
Wikipedia: "Arbiter (electronics)", retrieved from the URL:https://en.wikipedia.org/wiki/Arbiter_(electronics) on Nov. 20, 2020, pp. 1-3.

* cited by examiner

*Primary Examiner* — Edward J Dudek, Jr.
*Assistant Examiner* — Ralph A Verderamo, III
(74) *Attorney, Agent, or Firm* — Moore IP

(57) ABSTRACT

A device includes a scoreboard and a processor. The scoreboard includes scoreboard entries configured to store information regarding one or more uncompleted memory access operations. The scoreboard also includes a dependency matrix configured to store dependency information corresponding to the scoreboard entries. The processor is configured to retrieve a first memory access instruction that indicates a first address range of a first memory access operation, and to add an indication of the first memory access instruction to a first scoreboard entry. The processor is further configured to, based on determining that the first address range at least partially overlaps a second address range associated with a second scoreboard entry that corresponds to a second memory access instruction, set an element of the dependency matrix to have a has-dependency value indicating a dependency of the first scoreboard entry on the second scoreboard entry.

30 Claims, 7 Drawing Sheets

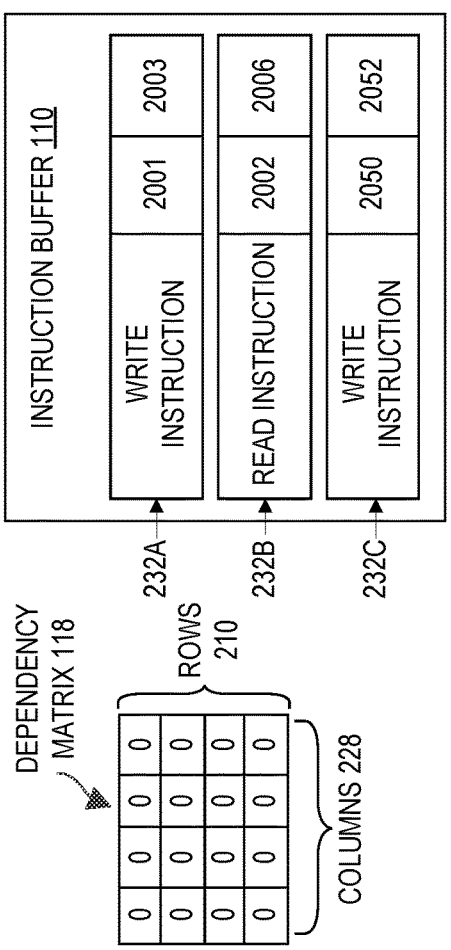
FIG. 2A
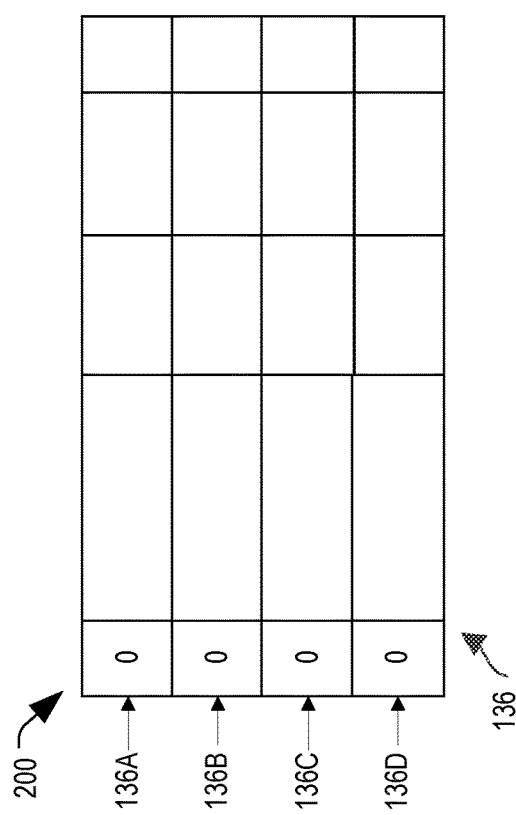
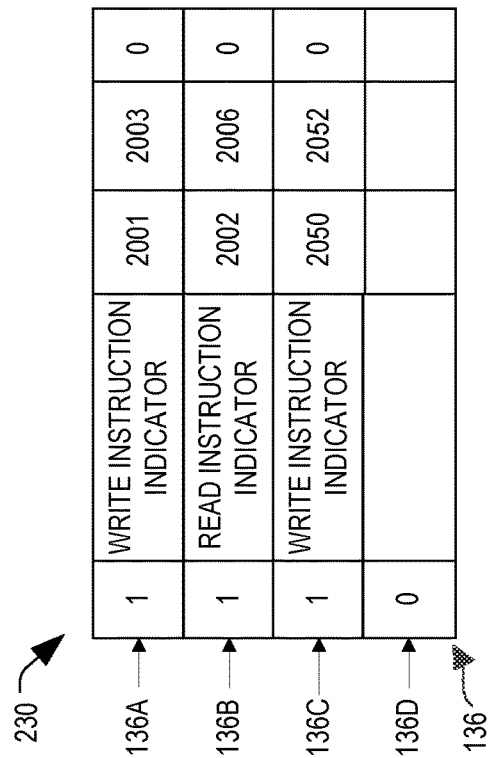
FIG. 2B

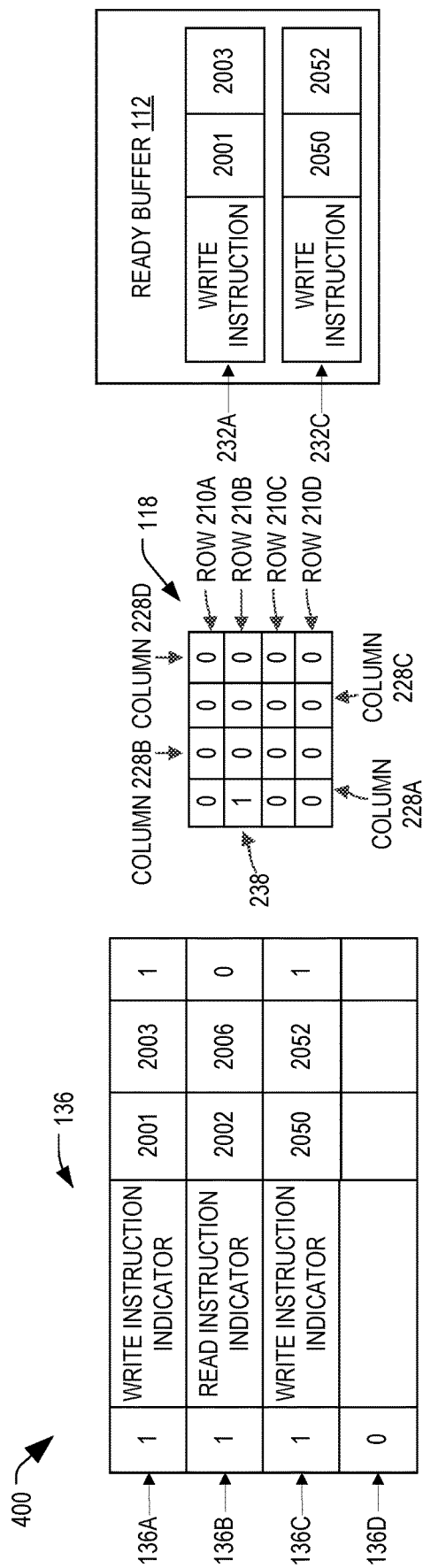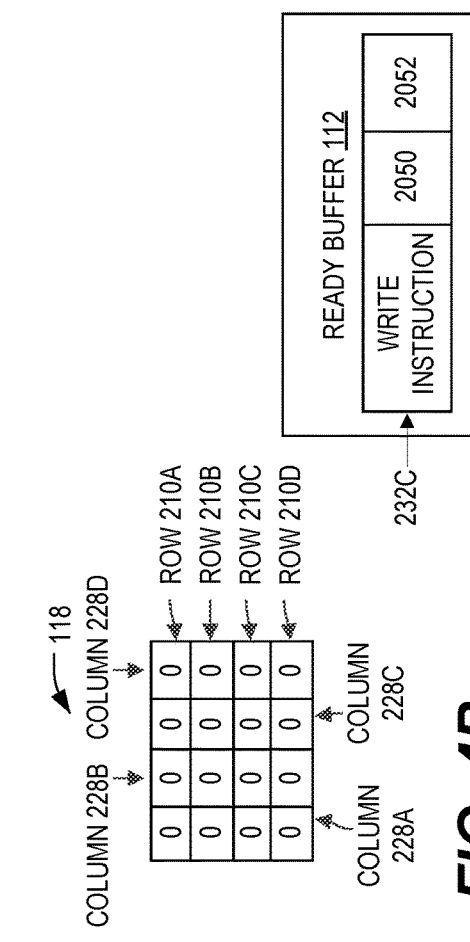
FIG. 4A
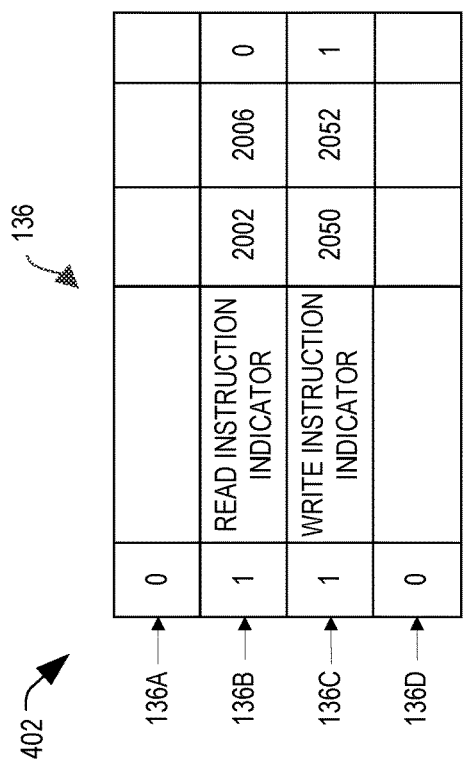
FIG. 4B

600

602
RETRIEVE A FIRST MEMORY ACCESS INSTRUCTION FROM AN INSTRUCTION BUFFER, THE FIRST MEMORY ACCESS INSTRUCTION INDICATING A FIRST ADDRESS RANGE OF A FIRST MEMORY ACCESS OPERATION

604
ADD AN INDICATION OF THE FIRST MEMORY ACCESS INSTRUCTION TO A FIRST SCOREBOARD ENTRY OF A PLURALITY OF SCOREBOARD ENTRIES OF A SCOREBOARD

606
BASED ON DETERMINING THAT THE FIRST ADDRESS RANGE AT LEAST PARTIALLY OVERLAPS A SECOND ADDRESS RANGE ASSOCIATED WITH A SECOND SCOREBOARD ENTRY OF THE PLURALITY OF SCOREBOARD ENTRIES THAT CORRESPONDS TO A SECOND MEMORY ACCESS INSTRUCTION, SET AN ELEMENT OF A DEPENDENCY MATRIX TO HAVE A HAS-DEPENDENCY VALUE INDICATING A DEPENDENCY OF THE FIRST SCOREBOARD ENTRY ON THE SECOND SCOREBOARD ENTRY

*FIG. 6*

MEMORY ACCESS MANAGEMENT

I. CROSS-REFERENCE TO RELATED APPLICATIONS

The present application claims priority from U.S. Provisional Patent Application No. 62/969,598, filed Feb. 3, 2020, entitled "MEMORY ACCESS MANAGEMENT," which is incorporated herein by reference in its entirety.

II. FIELD OF THE DISCLOSURE

The present disclosure is generally related to memory access management.

III. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Typically, a memory access instruction executed by a processor in a computing device accesses data via retrieval of all or a portion of a data unit, referred to as a "cache-line," from a cache or other form of memory. Multiple memory access instructions that access the same cache-line are performed in the order that they are received. For example, a subsequently received read instruction that accesses the same cache-line as a previously received write instruction is stalled until the write instruction is performed to avoid potential read-after-write data hazards. However, memory access instructions that access different cache-lines can be performed out-of-order. For example, read and write instructions that access different regions of memory can be performed in any order. A memory access instruction that accesses a large region of memory corresponding to multiple cache-lines can be decomposed into a series of cache-line accesses. Converting an instruction into multiple instructions can limit performance by using more memory to store the instructions, increasing the number of comparisons to determine whether an instruction can be performed out-of-order, or both.

IV. SUMMARY

In a particular aspect, a device includes a scoreboard and a processor. The scoreboard includes a plurality of scoreboard entries configured to store information regarding one or more uncompleted memory access operations. The scoreboard also includes a dependency matrix configured to store dependency information corresponding to the plurality of scoreboard entries. The processor is configured to retrieve a first memory access instruction from an instruction buffer. The first memory access instruction indicates a first address range of a first memory access operation. The processor is also configured to add an indication of the first memory access instruction to a first scoreboard entry of the plurality of scoreboard entries. The processor is further configured to, based on determining that the first address range at least partially overlaps a second address range associated with a second scoreboard entry of the plurality of scoreboard entries that corresponds to a second memory access instruction, set an element of the dependency matrix to have a has-dependency value indicating a dependency of the first scoreboard entry on the second scoreboard entry.

In another particular aspect, a method of memory access management includes retrieving, at a device, a first memory access instruction from an instruction buffer. The first memory access instruction indicates a first address range of a first memory access operation. The method also includes adding, by the device, an indication of the first memory access instruction to a first scoreboard entry of a plurality of scoreboard entries of a scoreboard. The method further includes, based on determining that the first address range at least partially overlaps a second address range associated with a second scoreboard entry of the plurality of scoreboard entries that corresponds to a second memory access instruction, setting an element of a dependency matrix to have a has-dependency value indicating a dependency of the first scoreboard entry on the second scoreboard entry.

In another particular aspect, a computer-readable storage device stores instructions that, when executed by a processor, cause the processor to retrieve a first memory access instruction from an instruction buffer. The first memory access instruction indicates a first address range of a first memory access operation. The instructions, when executed by the processor, also cause the processor to add an indication of the first memory access instruction to a first scoreboard entry of a plurality of scoreboard entries of a scoreboard. The instructions, when executed by the processor, further cause the processor to, based on determining that the first address range at least partially overlaps a second address range associated with a second scoreboard entry of the plurality of scoreboard entries that corresponds to a second memory access instruction, set an element of a dependency matrix to have a has-dependency value indicating a dependency of the first scoreboard entry on the second scoreboard entry.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

FIG. 2A illustrates an example of one or more components of the system of FIG. 1, in accordance with some examples of the present disclosure.

FIG. 2B illustrates another example of one or more components of the system of FIG. 1, in accordance with some examples of the present disclosure.

FIG. 4A illustrates an example of one or more components of the system of FIG. 1, in accordance with some examples of the present disclosure.

FIG. 4B illustrates another example of one or more components of the system of FIG. 1, in accordance with some examples of the present disclosure.

FIG. 6 is a flow chart of an example of a method of memory access management that may be performed by the system of FIG. 1, in accordance with some examples of the present disclosure.

VI. DETAILED DESCRIPTION

Figure 1:
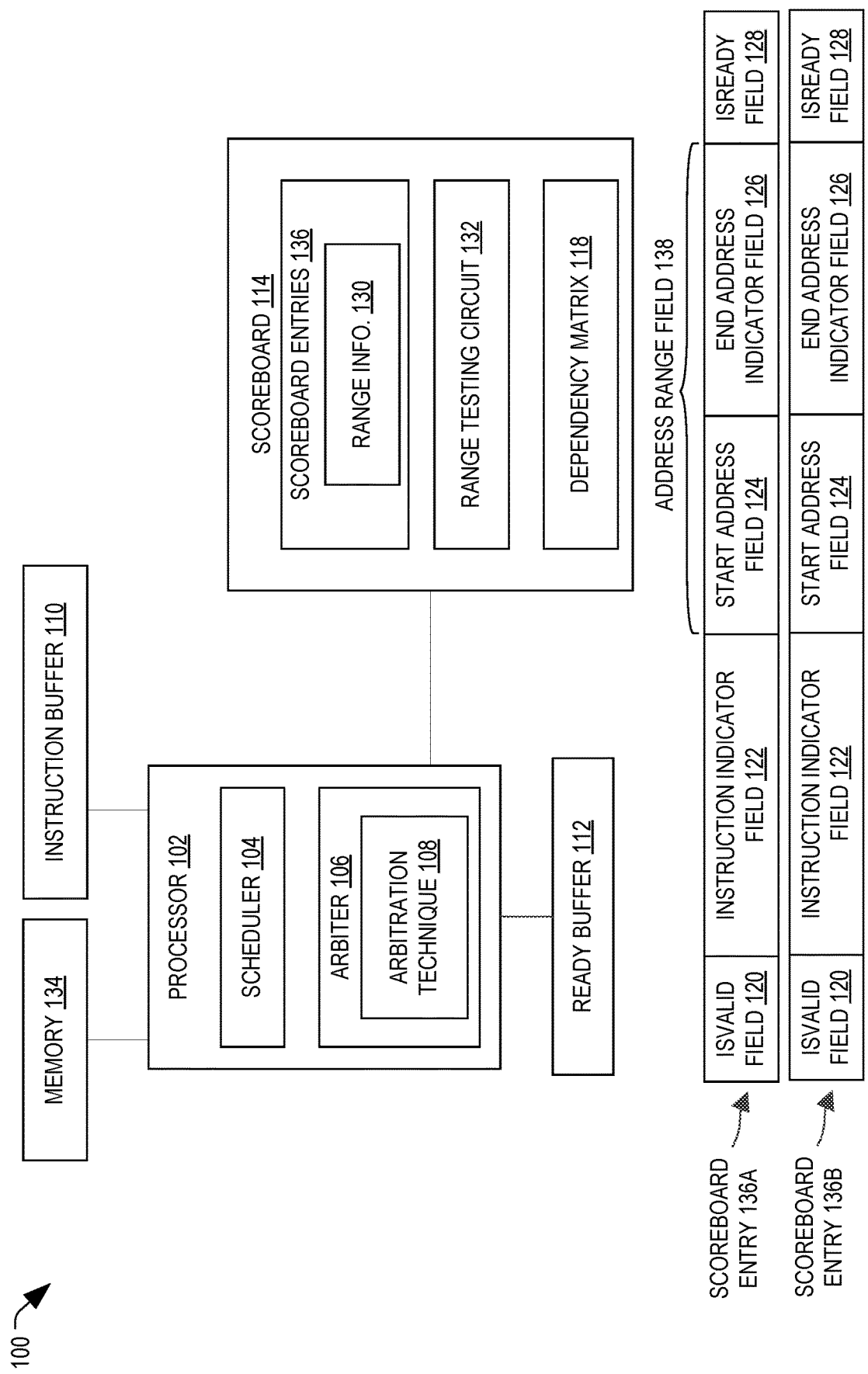
FIG. 1 is a block diagram of a particular illustrative aspect of a system operable to perform memory access management, in accordance with some examples of the present disclosure.

Systems and methods of memory access management are disclosed. A computing device includes a processor, an instruction buffer, a scoreboard, a ready buffer, and a memory. The processor includes a scheduler and an arbiter. In a particular example, the instruction buffer includes a first-in first-out (FIFO) buffer that stores memory access instructions to be performed. The scoreboard includes scoreboard entries that indicate uncompleted memory access operations. For example, the scheduler retrieves a memory access instruction from the instruction buffer and updates an available scoreboard entry (e.g., a first scoreboard entry) to indicate the retrieved memory access instruction (e.g., a first memory access instruction) and an address range, rather than a particular cache-line, associated with the first memory access instruction. The scheduler updates a dependency matrix of the scoreboard to indicate any dependency of the first scoreboard entry on other scoreboard entries. For example, the scheduler, in response to determining that the address range at least partially overlaps a second address range associated with a prior memory access instruction that is indicated by a second scoreboard entry, updates the dependency matrix to indicate that the first scoreboard entry has a dependency on the second scoreboard entry.

Performance of a memory access instruction is stalled until the dependency matrix indicates that all dependencies of the memory access instruction on prior memory access instructions have been resolved. Continuing the above example, the first memory access instruction is stalled due to its dependency on the prior memory access instruction, and the prior memory access instruction may be stalled due to dependencies on one or more earlier memory access instructions. The scheduler, in response to determining that the dependency matrix indicates that the second scoreboard entry has no dependency on other scoreboard entries (e.g., all dependencies of the prior memory access instruction on earlier memory access instructions have been resolved), updates the ready buffer to indicate that the prior memory access instruction is ready to be executed.

The ready buffer indicates memory access instructions that are ready to be executed in any order (e.g., having no dependencies on uncompleted memory access operations that represent a data hazard). The arbiter may use a memory access arbitration technique to select a memory access instruction from the ready buffer and initiates execution of the selected memory access instruction. The scheduler, in response to determining that a memory access instruction has been executed, updates the dependency matrix to remove all dependencies on the completed instruction. For example, upon execution of the prior memory access instruction, the dependence of the first memory access operation on the prior memory access operation is removed, and the scoreboard entry corresponding to the prior memory access instruction is marked as available for reuse. If the first memory access instruction has no more dependencies, the ready buffer can be updated to indicate that the first memory access instruction is available for execution.

By performing comparisons of address ranges (instead of cache-lines) for memory access instructions at the scoreboard, performance is improved by enabling out-of-order execution of instructions that access large memory regions (across multiple cache-lines) without having to decompose each instruction into a series of single cache-line instructions. Performance is also improved by enabling out-of-order execution of instructions that access non-overlapping addresses ranges corresponding to the same cache-line.

Figure 7:
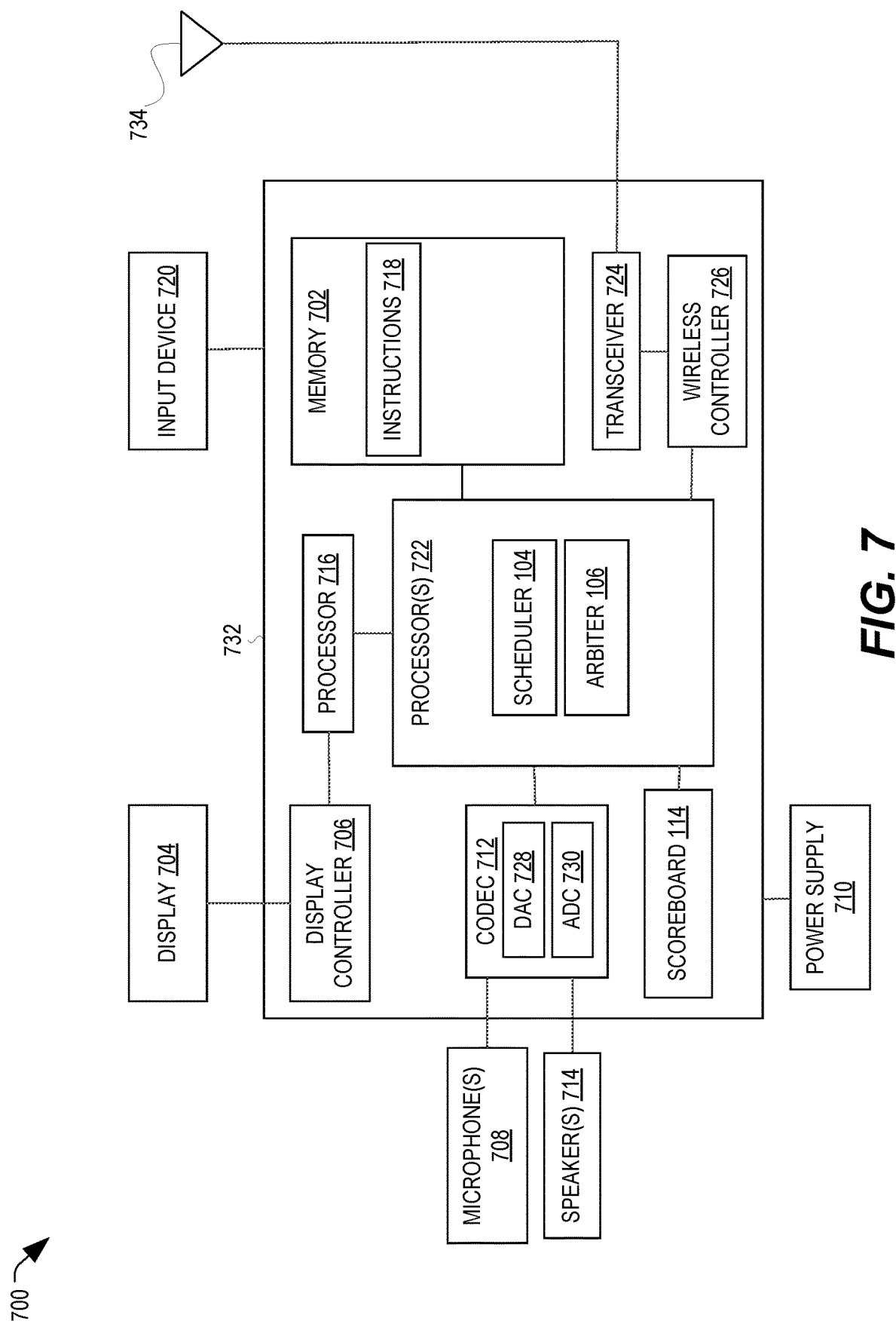
FIG. 7 is a block diagram of a particular illustrative example of a device that is operable to perform memory access management, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 7 depicts a device 732 including one or more processors ("processor(s)" 722 in FIG. 7), which indicates that in some implementations the device 732 includes a single processor 722 and in other implementations the device 732 includes multiple processors 722. For ease of reference herein, such features are generally introduced as "one or more" features and are subsequently referred to in the singular unless aspects related to multiple of the features are being described.

It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system operable to perform memory access management is disclosed and generally designated 100. The system 100 (e.g., a computing device) includes a processor 102 coupled to a memory 134, an instruction buffer 110, a scoreboard 114, a ready buffer 112, or a combination thereof. The processor 102 includes a scheduler 104, an arbiter 106, or both. The scoreboard 114 includes a plurality of scoreboard entries 136, a dependency matrix 118, a range testing circuit 132, or a combination thereof.

The instruction buffer 110 is configured to store memory access instructions to be executed by the processor 102. A memory access instruction includes a read access instruction or a write access instruction. In a particular aspect, the instruction buffer 110 includes instructions associated with multiple threads, multiple applications, or a combination thereof. The scoreboard 114 is configured to track uncompleted memory access operations using the plurality of scoreboard entries 136 and the dependency matrix 118. The plurality of scoreboard entries 136 is configured to store information regarding one or more uncompleted memory access operations. Each particular entry of the plurality of scoreboard entries 136 is configured to store information regarding a respective memory access instruction that is assigned to that particular entry by the scheduler 104, including range information 130 associated with the memory access instruction. For example, the range information 130 of a particular entry is indicated by an address range field of the particular entry.

The range testing circuit 132 is configured to determine, based on the range information 130, whether a first address range corresponding to a first scoreboard entry at least partially overlaps a second address range corresponding to a second scoreboard entry. Examples of address range comparisons that may be performed by the range testing circuit 132 are described in further detail with reference to FIG. 3.

The dependency matrix 118 is configured to store dependency information corresponding to the uncompleted memory access operations indicated in the scoreboard entries 136. In some implementations, the dependency matrix 118 is populated and maintained by the scheduler 104, as described further below.

The scheduler 104 is configured to update the plurality of scoreboard entries 136 to indicate memory access instructions retrieved from the instruction buffer 110. For example, the scheduler 104 is configured to locate an available entry among the plurality of scoreboard entries 136, select an instruction from the instruction buffer 110, and write information regarding the instruction into the located entry. In an illustrative example, the scheduler 104 selects a first memory access instruction from the instruction buffer 110, locates a first scoreboard entry that is available, and writes information including a first address range associated with the first memory access instruction into the first scoreboard entry. The scheduler 104 initiates operation of the range testing circuit 132 to identify range overlaps between the first address range of the newly added instruction and address ranges of scoreboard entries associated with other instructions. Based on determining that the range testing circuit 132 indicates that the first address range at least partially overlaps a second address range of another instruction, the scheduler 104 is configured to update the dependency matrix 118 to indicate that the first scoreboard entry has a dependency on the second scoreboard entry.

In response to determining that the dependency matrix 118 indicates that a scoreboard entry has no dependency on any of the plurality of scoreboard entries 136 (either because the address range of the scoreboard entry did not overlap address ranges of existing instructions, or because all existing instructions with overlapping address ranges have been executed), the scheduler 104 is configured to add an indication of a corresponding memory access instruction to the ready buffer 112 to indicate that the memory access instruction is ready for execution in any order.

The ready buffer 112 is configured to store information regarding a plurality of memory access instructions that are available for execution in any order. The ready buffer 112 is accessible to the arbiter 106, which is configured to retrieve, based on a memory access arbitration technique 108, a memory access instruction from the ready buffer 112 and to initiate execution of the memory access instruction. In response to determining that execution of the memory access instruction is complete, the scheduler 104 is configured to update the dependency matrix 118 to remove all dependencies on the scoreboard entry corresponding to the memory access instruction and to mark the scoreboard entry as available. Memory access instructions that were stalled because of a dependency on the executed memory access instruction can proceed to execution (upon resolution of any dependencies on other memory access instructions).

During operation, the processor 102 queues, in the instruction buffer 110, memory access instructions to be executed, as further described with reference to FIG. 2A. For example, during processing of an application, the processor 102 stores a memory access instruction of the application in the instruction buffer 110 for execution. In a particular aspect, the instruction buffer 110 stores memory access instructions corresponding to multiple threads, multiple applications, or a combination thereof.

The scheduler 104, in response to determining that the instruction buffer 110 includes at least one memory access instruction, determines whether the plurality of scoreboard entries 136 includes any available scoreboard entries or whether all scoreboard entries are in use. In a particular illustrative example, a scoreboard entry 136A of the plurality of scoreboard entries 136 is selected by the scheduler 104 as an available scoreboard entry. As illustrated, the scoreboard entry 136A includes an isValid field 120, an instruction indicator field 122, an address range field 138, an isReady field 128, one or more additional fields, or a combination thereof. In a particular aspect, the address range field 138 includes a start address field 124, an end address indicator field 126, or both. In various implementations, the end address indicator field 126 includes an end address field, a length (or size) field, or both. In a particular aspect, the address range field 138 of the scoreboard entry 136A indicates the range information 130 of the scoreboard entry 136A. In a particular aspect, the scheduler 104 determines that the scoreboard entry 136A is available in response to determining that the isValid field 120 (e.g., a validity indicator) has a first value (e.g., 0).

The scheduler 104, in response to determining that the scoreboard entry 136A is available, retrieves a memory access instruction from the instruction buffer 110 and adds an indication of the memory access instruction to the scoreboard entry 136A, as further described with reference to FIG. 2B. For example, the scheduler 104 sets the isValid field 120 to a second value (e.g., 1) to indicate that the scoreboard entry 136A is in use. The scheduler 104 sets the instruction indicator field 122 to a value indicating a type of the memory access instruction (e.g., a read instruction or a write instruction) and sets the address range field 138 to a value indicating an address range of the memory access instruction. As an example, the memory access instruction indicates that a memory access operation is to be performed in a first region of the memory 134 spanning multiple cache lines, and the scheduler 104 sets the start address field 124 to a value indicating a start address of the first region and sets the end address indicator field 126 to a value indicating an end address of the first region. For example, the value of the end address indicator field 126 indicates the end address, a length of the first region, or both. In a particular aspect, the range information 130 of the scoreboard entry 136A includes the address range (e.g., the start address, the end address, the length of the first region, or a combination thereof) of the memory access instruction. The scheduler 104 sets the isReady field 128 to a first value (e.g., 0) to indicate that the memory access instruction has not been added to the ready buffer 112.

The scheduler 104, subsequent to updating the scoreboard entry 136A, determines whether the scoreboard entry 136A has a dependency on any other of the plurality of scoreboard entries 136. For example, the scheduler 104, in response to determining that the isValid field 120 of a scoreboard entry 136B of the plurality of scoreboard entries 136 has the second value (e.g., 1), provides a first indicator (e.g., a first entry index) of the scoreboard entry 136A and a second indicator (e.g., a second entry index) of the scoreboard entry 136B to the range testing circuit 132. The range testing circuit 132 determines whether a first address range indicated by the address range field 138 of the scoreboard entry 136A at least partially overlaps a second address range indicated by the address range field 138 of the scoreboard entry 136B, as further described with reference to FIG. 3. The range testing circuit 132 returns a non-overlap indication (e.g., a 0 value) in response to determining that the first address range does not overlap the second address range. Alternatively, the range testing circuit 132 returns an overlap indication (e.g., a 1 value) in response to determining that the first address range at least partially overlaps the second address range.

The scheduler 104 updates the dependency matrix 118 based on a value received from the range testing circuit 132, as further described with reference to FIG. 2B. For example, the dependency matrix 118 includes an element corresponding to the scoreboard entry 136A and the scoreboard entry 136B. The scheduler 104, in response to receiving a non-overlap indication from the range testing circuit 132 indicating that the first address range does not overlap the second address range, sets the element of the dependency matrix 118 to a no-dependency value (e.g., 0) indicating that the scoreboard entry 136A does not have a dependency on the scoreboard entry 136B. Alternatively, the scheduler 104, in response to receiving an overlap indication from the range testing circuit 132 indicating that the first address range at least partially overlaps the second address range, sets the element to a has-dependency value (e.g., 1) indicating that the scoreboard entry 136A has a dependency on the scoreboard entry 136B.

The scheduler 104, in response to determining that the ready buffer 112 is not full, determines whether any of the plurality of scoreboard entries 136 indicates a valid memory access instruction that can be moved to the ready buffer 112, as further described with reference to FIG. 2A. For example, the scheduler 104 determines that the memory access instruction indicated by the scoreboard entry 136A can be moved to the ready buffer 112 in response to determining that the isValid field 120 of the scoreboard entry 136A has a second value (e.g., 1) indicating that the scoreboard entry 136A indicates a valid memory access instruction, that the isReady field 128 has a first value (e.g., 0) indicating that the memory access instruction corresponding to the scoreboard entry 136A is not already in the ready buffer 112, and that the dependency matrix 118 indicates that the scoreboard entry 136A has no dependency on any of the plurality of scoreboard entries 136.

The scheduler 104, in response to determining that the memory address memory access instruction indicated by the scoreboard entry 136A can be moved to the ready buffer 112, adds an indication of the memory access instruction to the ready buffer 112, as further described with reference to FIG. 4A, such as by adding an indicator (e.g., an entry index) of the scoreboard entry 136A along with the indication of the memory access instruction to the ready buffer 112. The scheduler 104 updates the scoreboard entry 136A to indicate that the corresponding memory access instruction has been added to the ready buffer 112. For example, the scheduler 104 sets the isReady field 128 of the scoreboard entry 136A to a second value (e.g., 1) to indicate that the memory access instruction corresponding to the 136A has been added to the ready buffer 112. In a particular implementation, a ready buffer 112 distinct from the scoreboard 114 is omitted. In this implementation, adding an indication of the memory access instruction (that is indicated by the scoreboard entry 136A) to the ready buffer 112 corresponds to setting the isReady field 128 of the scoreboard entry 136A to the second value (e.g., 1).

The arbiter 106, in response to determining that the ready buffer 112 is not empty, uses a memory access arbitration technique 108 to select a memory access instruction from the ready buffer 112. In the implementation where a ready buffer 112 distinct from the scoreboard 114 is omitted, selecting a memory access instruction from the ready buffer 112 corresponds to selecting the memory access instruction indicated by a valid scoreboard entry with the isReady field 128 having the second value (e.g., 1) indicating that the memory access instruction is ready for execution. In various implementations, the memory access arbitration technique 108 can include a round robin technique, a priority-based technique, a first-in first-out technique, a random selection technique, or a combination thereof. In response to the arbiter 106 selecting the memory access instruction indicated by the scoreboard entry 136A, the arbiter 106 removes the indication of the memory access instruction, the indicator of the scoreboard entry 136A, or both, from the ready buffer 112. The arbiter 106 initiates execution of a memory access operation indicated by the selected memory access instruction. The arbiter 106, subsequent to execution of the memory access operation, provides an output to the scheduler 104 indicating that execution of the memory access instruction indicated by the scoreboard entry 136A has completed.

The scheduler 104, in response to receiving the output from the arbiter 106, updates a validity indicator (e.g., the isValid field 120) of the scoreboard entry 136A to mark the scoreboard entry 136A as available, as further described with reference to FIG. 4B. For example, the scheduler 104 sets the isValid field 120 of the scoreboard entry 136A to a first value (e.g., 0) indicating that information indicated by other fields of the scoreboard entry 136A is invalid and that the scoreboard entry 136A is available. The scheduler 104 updates the dependency matrix 118 to remove all dependencies on the scoreboard entry 136A, as further described with reference to FIG. 4B.

In a particular example, a memory access instruction that was stalled because of a dependency of a corresponding scoreboard entry on the scoreboard entry 136A has (subsequent to the update of the dependency matrix 118) no dependencies on any of the plurality of scoreboard entries 136, and the corresponding memory access instruction can be moved to the ready buffer 112, as further described with reference to FIG. 5A. The arbiter 106 can initiate execution of the memory access instruction, as further described with reference to FIG. 5B.

The system 100 thus enables in-order execution of memory access instructions with overlapping address ranges and any-order execution of memory access instructions with address ranges that do not overlap. The in-order execution of the memory access instructions with overlapping address ranges preserves the order of changes and read accesses to the same memory regions. The any-order execution of the memory access instructions with address ranges that do not overlap enables performance improvements. For example, performance is improved by enabling out-of-order execution of instructions that access non-overlapping addresses ranges corresponding to the same cache-line. As another example, performance is improved by enabling out-of-order execution of instructions that access large memory regions (across multiple cache-lines) without having to decompose each instruction into a series of single cache-line instructions.

Although the scoreboard 114 is depicted as distinct from the processor 102, in other implementations the scoreboard 114 is at least partially implemented in the processor 102, at least partially implemented in the memory 134, or a combination thereof. Although the dependency matrix 118 is depicted as distinct from the plurality of scoreboard entries 136, in other implementations the dependency matrix 118 can be implemented in the plurality of scoreboard entries 136. For example, each entry in the plurality of scoreboard entries 136 can include a set of bits that corresponds to a row of the dependency matrix 118. Although the ready buffer 112 is depicted, in other implementations the ready buffer 112 is omitted and the arbiter 106 selects from the plurality of scoreboard entries 136 based on the isReady field 128 values.

Although the scoreboard 114 is depicted as including the range testing circuit 132, in other implementations the range testing circuit 132 is omitted and the scheduler 104 performs comparisons described herein with reference to the range testing circuit 132. Alternatively, in some implementations the range testing circuit 132 is configured to check all range dependencies and update all affected entries in the dependency matrix 118 responsive to changes in any scoreboard entry's isValid field 120 (e.g., a new instruction is added or an existing instruction is removed), and independent of the scheduler 104.

Referring to FIG. 2A, an example 200 of one or more components of the system 100 is shown. For example, the plurality of scoreboard entries 136 includes another example of the scoreboard entry 136A and the scoreboard entry 136B, and also includes a scoreboard entry 136C and a scoreboard entry 136D. The plurality of scoreboard entries 136 including four scoreboard entries is provided as an illustrative example. In other examples, the plurality of scoreboard entries 136 includes fewer than four scoreboard entries or more than four scoreboard entries.

The isValid field 120 of each of the plurality of scoreboard entries 136 is initially set to a first value (e.g., 0) indicating that the scoreboard entry is available. The dependency matrix 118 includes a plurality of rows 210 and a plurality of columns 228. Each of the plurality of rows 210 corresponds to one of the plurality of scoreboard entries 136 and each of the plurality of columns 228 corresponds to one of the plurality of scoreboard entries 136, as further described with reference to FIG. 2B.

Each element of the dependency matrix 118 is initialized to a no-dependency value (e.g., 0) indicating no dependency between the scoreboard entries 136. The instruction buffer 110 includes a memory access instruction 232A corresponding to a write operation to a first address range with a first start address (e.g., 2001) and a first end address (e.g., 2003). The instruction buffer 110 includes a memory access instruction 232B corresponding to a read operation from a second address range with a second start address (e.g., 2002) and a second end address (e.g., 2006). The instruction buffer 110 includes a memory access instruction 232C corresponding to a write operation to a third address range with a third start address (e.g., 2050) and a third end address (e.g., 2052). In a particular aspect, the instruction buffer 110 stores instructions in the order that the instructions are received by the instruction buffer 110. In an example, the instruction buffer 110 includes a FIFO buffer.

Referring to FIG. 2B, an example 230 of one or more components of the system 100 is shown. In a particular aspect, FIG. 2A illustrates an example of a first state of one or more components of the system 100 at a first time and FIG. 2B illustrates an example of a second state of one or more components of the system 100 at a second time that is subsequent to the first time.

As depicted in FIG. 2B, the dependency matrix 118 includes a row 210A and a column 228A corresponding to the scoreboard entry 136A, a row 210B and a column 228B corresponding to the scoreboard entry 136B, a row 210C and a column 228C corresponding to the scoreboard entry 136C, and a row 210D and a column 228D corresponding to the scoreboard entry 136D. In a particular aspect, a row 210 corresponding to a scoreboard entry indicates whether that scoreboard entry has a dependency on the plurality of scoreboard entries 136, and a column corresponding to that scoreboard entry indicates whether the plurality of scoreboard entries 136 have a dependency on that scoreboard entry. To illustrate, values of the row 210A indicate whether the scoreboard entry 136A has a dependency on any of the plurality of scoreboard entries 136, and values of the column 228A indicate whether any of the plurality of scoreboard entries 136 have a dependency on the scoreboard entry 136A.

It should be understood that a particular implementation of the dependency matrix 118 is provided as an illustrative example. In other implementations, dependencies of the plurality of scoreboard entries 136 can be tracked using other techniques or data structures. For example, in a particular implementation, a row of the dependency matrix 118 can indicate whether the plurality of scoreboard entries 136 have a dependency on the scoreboard entry, and the column of the dependency matrix 118 can indicate whether the scoreboard entry has a dependency on the plurality of scoreboard entries 136. To illustrate, in this implementation, values of the row 210A indicate whether any of the plurality of scoreboard entries 136 have a dependency on the scoreboard entry 136A, and values of the column 228A indicate whether the scoreboard entry 136A has a dependency on any of the plurality of scoreboard entries 136.

The scheduler 104, in response to determining that the instruction buffer 110 includes at least one memory access instruction and that the scoreboard 114 includes at least one available scoreboard entry (e.g., with isValid field 120 set to a first value (e.g., 0)), retrieves the next instruction (e.g., the memory access instruction 232A) from the instruction buffer 110 and updates the scoreboard entry 136A to indicate the memory access instruction 232A. For example, the scheduler 104 sets the isValid field 120 to have a second value (e.g., 1), the instruction indicator field 122 to indicate a type of the memory access instruction 232A, the start address field 124 to indicate the first start address (e.g., 2001), the end address indicator field 126 to indicate the first end address (e.g., 2003), the isReady field 128 to a first value (e.g., 0), or a combination thereof. The scheduler 104, in response to determining that none of the other scoreboard entries of the plurality of scoreboard entries 136 include a valid entry (e.g., isValid field 120 indicates a first value for all other scoreboard entries), sets each element of the row 210A to indicate that the scoreboard entry 136A has no dependency on the plurality of scoreboard entries 136. For example, the scheduler 104 sets each element of the row 210A to indicate a no-dependency value (e.g., 0) or refrains from updating the values of the row 210A (e.g., already initialized to indicate the no-dependency value).

The scheduler 104 retrieves the memory access instruction 232B from the instruction buffer 110 and updates the scoreboard entry 136B to indicate the memory access instruction 232B. The scheduler 104, in response to determining that the scoreboard entry 136A includes a valid entry (e.g., isValid field 120 has a second value (e.g., 1)), determines whether a second address range (e.g., 2002 to 2006) of the memory access instruction 232B indicated by the scoreboard entry 136B at least partially overlaps a first address range (e.g., 2001 to 2003) of the memory access instruction 232A indicated by the scoreboard entry 136A. For example, the scheduler 104 provides a first indicator (e.g., a first entry index) of the scoreboard entry 136B and a second indicator (e.g., a second entry index) of the scoreboard entry 136A to the range testing circuit 132 of FIG. 1. The range testing circuit 132 performs a comparison of the second address range (e.g., 2002 to 2006) of the memory access instruction 232B indicated by the scoreboard entry 136B and the first address range (e.g., 2001 to 2003) of the memory access instruction 232A indicated by the scoreboard entry 136A, as further described with reference to FIG. 3. The range testing circuit 132, based on the comparison of the first address range and the second address range, provides a second value (e.g., 1) to the scheduler 104 indicating that the first address range at least partially overlaps the second address range. The scheduler 104, in response to determining (e.g., based on the second value received from the range testing circuit 132) that the first address range at least partially overlaps the second address range, sets an element 238 of the dependency matrix 118 to a has-dependency value (e.g., 1) to indicate that the scoreboard entry 136B (corresponding to the row 210B of the element 238) has a dependency on the scoreboard entry 136A (corresponding to the column 228A of the element 238).

In a particular aspect, the scheduler 104 determines whether address ranges overlap for instructions that include at least one write instruction. For example, the scheduler 104, in response to determining that at least one of the memory access instruction 232A or the memory access instruction 232B includes a write instruction, determines whether the first address range at least partially overlaps the second address range. Alternatively, the scheduler 104, in response to determining that each of the memory access instruction 232A and the memory access instruction 232B corresponds to a read instruction, refrains from performing a comparison of the first address range and the second address range and sets the element 238 to a no-dependency value (e.g., 0) indicating no dependency of the scoreboard entry 136B on the scoreboard entry 136A. The read requests can thus occur in any order and a later read request to a memory region is not stalled based on an earlier read request to an overlapping memory region.

The scheduler 104 retrieves the memory access instruction 232C from the instruction buffer 110 and updates the scoreboard entry 136C to indicate the memory access instruction 232C. The scheduler 104, in response to determining that an address range (e.g., 2050 to 2052) does not overlap an address range of another valid scoreboard entry (e.g., the first address range of the scoreboard entry 136A or the second address range of the scoreboard entry 136B), sets the corresponding element of the dependency matrix 118 to a no-dependency value (e.g., 0) indicating no dependency of the scoreboard entry 136C on the other scoreboard entry. The scheduler 104 thus updates the dependency matrix 118 to indicate dependencies between pairs of the plurality of scoreboard entries 136.

Figure 3:
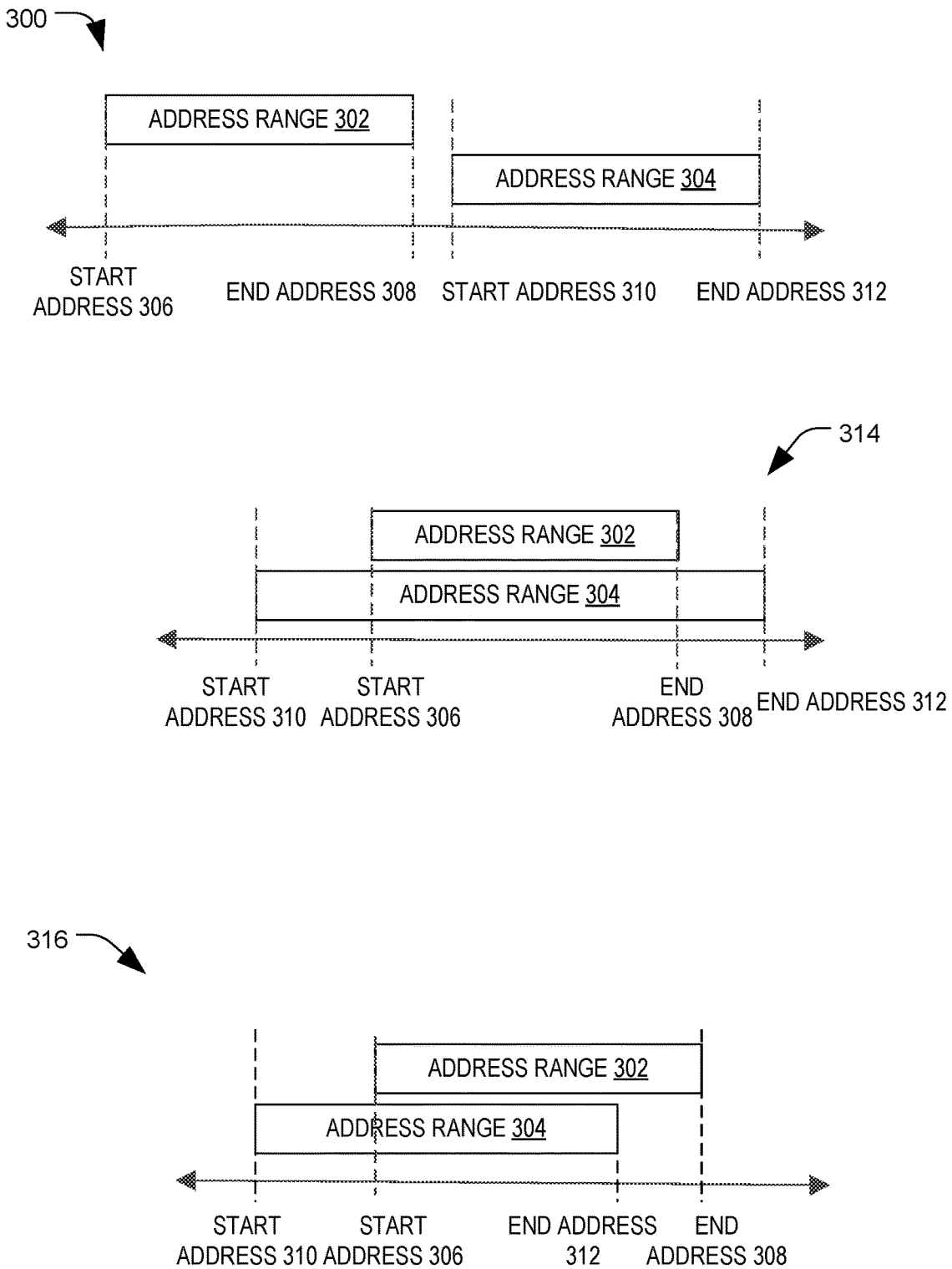
FIG. 3 illustrates examples of address range comparisons that may be performed by the system of FIG. 1, in accordance with some examples of the present disclosure.

FIG. 3 illustrates an example 300, an example 314, and an example 316 of address range comparisons that may be performed by the system of FIG. 1. In a particular aspect, the scheduler 104, the range testing circuit 132, the system 100 of FIG. 1, or a combination thereof, perform one or more operations described with reference to the example 300, the example 314, the example 316, or a combination thereof.

An address range 302 has a start address 306 and an end address 308. An address range 304 has a start address 310 and an end address 312. In a particular aspect, the address range 302 corresponds to the first address range of the memory access instruction 232A indicated by the scoreboard entry 136A, and the address range 304 corresponds to the second address range of the memory access instruction 232B indicated by the scoreboard entry 136B. The range testing circuit 132 determines whether the address range 304 at least partially overlaps the address range 302. For example, the range testing circuit 132 determines that the address range 304 at least partially overlaps the address range 302 in response to determining that the start address 310 is within the address range 302 or the end address 312 is within the address range 302. To illustrate, the range testing circuit 132 determines that the address range 304 at least partially overlaps the address range 302 in response to determining that the start address 310 is greater than or equal to the start address 306 and the start address 310 is less than the end address 308, or by determining that the end address 312 is greater than the start address 306 and the end address 312 is less than or equal to the end address 308.

Alternatively, the range testing circuit 132 determines that the address range 304 at least partially overlaps the address range 302 in response to determining that the start address 306 is within the address range 304 or the end address 308 is within the address range 304. To illustrate, the range testing circuit 132 determines that the address range 304 at least partially overlaps the address range 302 in response to determining that the start address 306 is greater than or equal to the start address 310 and the start address 306 is less than the end address 312, or by determining that the end address 308 is greater than the start address 310 and the end address 308 is less than or equal to the end address 312.

In the example 300, the range testing circuit 132 determines that the address range 304 does not overlap the address range 302 in response to determining that the start address 310 is not within the address range 302, that the end address 312 is not within the address range 302, that the start address 306 is not within the address range 304, and that the end address 308 is not within the address range 304. For example, the range testing circuit 132 determines that the address range 304 does not overlap the address range 302 in response to determining that the start address 310 is greater than the start address 306 but the start address 310 is not less than or equal to the end address 308 and that the end address 312 is greater than the start address 306 but the end address 312 is not less than or equal to the end address 308, in response to determining that the start address 306 is less than the end address 312 but the start address 306 is not greater than or equal to the start address 310 and that the end address 308 is less than or equal to the end address 312 but the end address 308 is not greater than the start address 310, or a combination thereof.

In the example 314, the range testing circuit 132 determines that the address range 304 at least partially overlaps the address range 302 in response to determining that the start address 306 is within the address range 304. For example, the range testing circuit 132 determines that the address range 304 at least partially overlaps the address range 302 in response to determining that the start address 306 is greater than or equal to the start address 310 and that the start address 306 is less than the end address 312. Alternatively, the range testing circuit 132 determines that the address range 304 at least partially overlaps the address range 302 in response to determining that the end address 308 is within the address range 304. For example, the range testing circuit 132 determines that the address range 304 at least partially overlaps the address range 302 in response to determining that the end address 308 is greater than the start address 310 and the end address 308 is less than or equal to the end address 312.

In the example 316, the range testing circuit 132 determines that the address range 304 at least partially overlaps the address range 302 in response to determining that the start address 306 is within the address range 304. Alternatively, the range testing circuit 132 determines that the address range 304 at least partially overlaps the address range 302 in response to determining that the end address 312 is within the address range 302. The range testing circuit 132 thus enables address range comparisons as compared to individual cache-line address comparisons.

Referring to FIG. 4A, an example 400 of one or more components of the system 100 is shown. In a particular aspect, FIG. 4A illustrates an example of a third state of one or more components of the system 100 at a third time that is subsequent to the second time of FIG. 2B.

The scheduler 104, in response to determining that the ready buffer 112 is not full and that the scoreboard 114 includes at least one valid entry with no dependency on the plurality of scoreboard entries 136 that has not been added to the ready buffer 112, adds an indication of a memory access instruction corresponding to the valid entry to the ready buffer 112. For example, the scheduler 104 determines, for the scoreboard entry 136A, that the isValid field 120 has a second value (e.g., 1) indicating a valid scoreboard entry and that the isReady field 128 has a first value (e.g., 0) indicating that an indication of the memory access instruction 232A has not been added to the ready buffer 112. The scheduler 104 determines that each value of the row 210A (corresponding to the scoreboard entry 136A) has a no-dependency value (e.g., 0) indicating that the scoreboard entry 136A has no dependency on the plurality of scoreboard entries 136. The scheduler 104 adds an indication of the memory access instruction 232A, an indication of the scoreboard entry 136A, or both, to the ready buffer 112. The scheduler 104 sets the isReady field 128 of the scoreboard entry 136A to a second value (e.g., 1) to indicate that an indication of the memory access instruction 232A has been added to the ready buffer 112. As another example, the scheduler 104, in response to determining that the scoreboard entry 136C includes a valid entry with no dependency on the plurality of scoreboard entries 136 that has not been added to the ready buffer 112, adds an indication of the memory access instruction 232C, an indication of the scoreboard entry 136C, or both, to the ready buffer 112. The scheduler 104 sets the isReady field 128 of the scoreboard entry 136C to indicate that an indication of the memory access instruction 232C has been added to the ready buffer 112.

The scheduler 104, in response to determining that the scoreboard entry 136B has a dependency on the scoreboard entry 136A, refrains from adding an indication of the memory access instruction 232B, an indication of the scoreboard entry 136B, or both, to the ready buffer 112. For example, the memory access instruction 232B is stalled pending execution of the memory access instruction 232A indicated by the scoreboard entry 136A.

Referring to FIG. 4B, an example 402 of one or more components of the system 100 is shown. In a particular aspect, FIG. 4B illustrates an example of a fourth state of one or more components of the system 100 at a fourth time that is subsequent to the third time of FIG. 4A.

The arbiter 106, in response to determining that the ready buffer 112 includes indications of multiple memory access instructions, uses a memory access arbitration technique 108 of FIG. 1 to select a memory access instruction. For example, the arbiter 106 selects the memory access instruction 232A, removes the indication of the memory access instruction 232A from the ready buffer 112, and initiates execution of the memory access instruction 232A. The arbiter 106, subsequent to execution of the memory access instruction 232A, provides a notification to the scheduler 104 indicating that execution of the memory access instruction 232A indicated by the scoreboard entry 136A is complete. The scheduler 104, in response to receiving the notification from the arbiter 106, sets each element of the column 228A (corresponding to the scoreboard entry 136A) to a no-dependency value (e.g., 0) to remove any dependencies on the scoreboard entry 136A and sets the isValid field 120 of the scoreboard entry 136A to a first value (e.g., 0) to indicate that the scoreboard entry 136A is available and does not include a valid entry. The arbiter 106 thus enables any order execution of instructions indicated in the ready buffer 112.

Figure 5A:
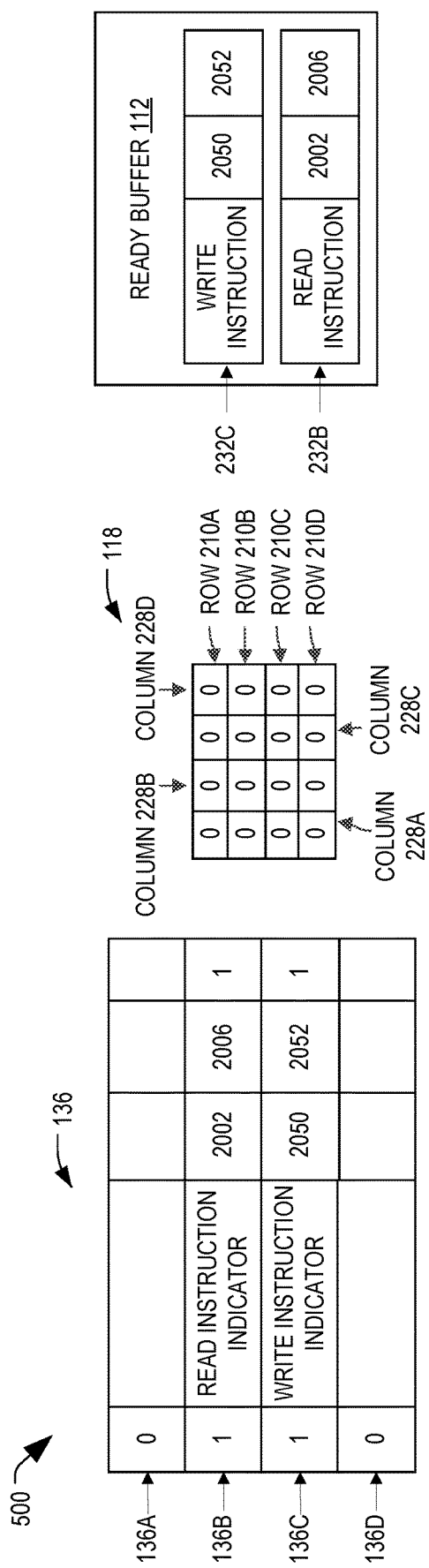
FIG. 5A illustrates another example of one or more components of the system of FIG. 1, in accordance with some examples of the present disclosure.

Referring to FIG. 5A, an example 500 of one or more components of the system 100 is shown. In a particular aspect, FIG. 5A illustrates an example of a fifth state of one or more components of the system 100 at a fifth time that is subsequent to the fourth time of FIG. 4B.

The scheduler 104, in response to determining that each element of the row 210B (corresponding to the scoreboard entry 136B) has a no-dependency value (e.g., 0) indicating no dependency, adds an indication of the memory access instruction 232B, an indication of the scoreboard entry 136B, or both, to the ready buffer 112 and sets the isReady field 128 of the scoreboard entry 136B to a second value (e.g., 1) indicating that an indication of the memory access instruction 232B has been added to the ready buffer 112. Execution of the memory access instruction 232B is thus no longer stalled subsequent to execution of the memory access instruction 232A.

Figure 5B:
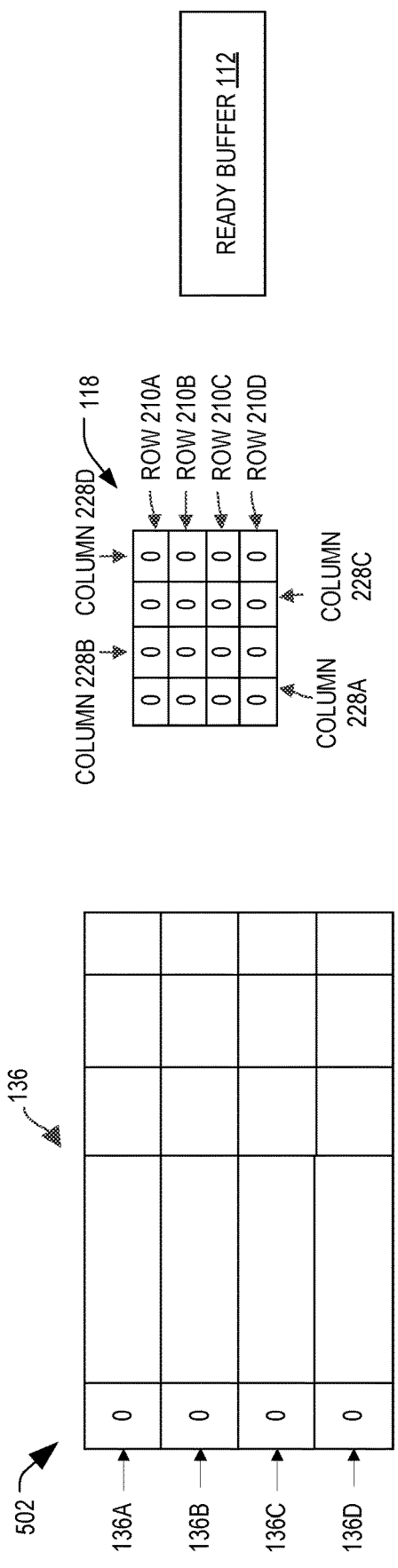
FIG. 5B illustrates another example of one or more components of the system of FIG. 1, in accordance with some examples of the present disclosure.

Referring to FIG. 5B, an example 502 of one or more components of the system 100 is shown. In a particular aspect, FIG. 5B illustrates an example of a sixth state of one or more components of the system 100 at a sixth time that is subsequent to the fifth time of FIG. 5A.

The arbiter 106 uses the memory access arbitration technique 108 to select the memory access instruction 232B or the memory access instruction 232C. The arbiter 106 initiates execution of the selected memory access instruction followed by initiating execution of the other memory access instruction. For example, the arbiter 106 initiates execution of the memory access instruction 232B, sets each element of the column 228B (corresponding to the scoreboard entry 136B) to a no-dependency value (e.g., 0) to remove any dependencies on the scoreboard entry 136B, and updates the isValid field 120 of the scoreboard entry 136B to a first value (e.g., 0) to indicate that the scoreboard entry 136B is available. The arbiter 106 initiates execution of the memory access instruction 232C, sets each element of the column 228C (corresponding to the scoreboard entry 136C) to a no-dependency value (e.g., 0) to remove any dependencies on the scoreboard entry 136C, and updates the isValid field 120 of the scoreboard entry 136C to a first value (e.g., 0) to indicate that the scoreboard entry 136C is available.

The system 100 thus enables in-order execution of instructions (e.g., the memory access instruction 232A and the memory access instruction 232B) that access overlapping memory regions and any-order execution of instructions (e.g., the memory access instruction 232B and the memory access instruction 232C) that access non-overlapping memory regions.

Referring to FIG. 6, a method of memory access management is disclosed and generally designated method 600. In a particular aspect, one or more operations of the method 600 are performed by the scheduler 104, the range testing circuit 132, the processor 102, the system 100 of FIG. 1, or a combination thereof.

In block 602, the method 600 includes retrieving a first memory access instruction from an instruction buffer. For example, the scheduler 104 retrieves the memory access instruction 232B from the instruction buffer 110, as described with reference to FIG. 2B. The memory access instruction 232B indicates a first address range (e.g., 2002 to 2006) of a first memory access operation (e.g., a read operation).

In block 604, the method 600 includes adding an indication of the first memory access instruction to a first scoreboard entry of a plurality of scoreboard entries of a scoreboard. For example, the scheduler 104 adds an indication of the memory access instruction 232B to the scoreboard entry 136B of the plurality of scoreboard entries 136 of the scoreboard 114, as described with reference to FIG. 2B.

In block 606, the method 600 includes, based on determining that the first address range at least partially overlaps a second address range associated with a second scoreboard entry of the plurality of scoreboard entries that corresponds to a second memory access instruction, setting an element of a dependency matrix to have a has-dependency value indicating a dependency of the first scoreboard entry on the second scoreboard entry. For example, the scheduler 104, based on determining that the first address range (e.g., 2002 to 2006) at least partially overlaps a second address range (e.g., 2001 to 2003), sets the element 238 to have a value (e.g., 1) indicating a dependency of the scoreboard entry 136B on the scoreboard entry 136A, as described with reference to FIG. 2B.

The method 600 thus enables determining dependencies between scoreboard entries based on address range comparisons. For example, the range testing circuit 132 compares the first address range (e.g., 2002 to 2006) to the second address range (e.g., 2001 to 2003) and determines that the first address range at least partially overlaps the second address range. Execution of instructions that have a dependency on another instruction is stalled until the dependency is resolved.

Referring to FIG. 7, a block diagram of a particular illustrative implementation of a device 700 is shown. In various implementations, the device 700 may have more or fewer components than illustrated in FIG. 7. In an illustrative implementation, the device 700 includes one or more components of the system 100 of FIG. 1. In an illustrative implementation, the device 700 may perform one or more operations described with reference to FIGS. 1-6.

In a particular implementation, the device 700 includes a processor 716 (e.g., a central processing unit (CPU)). The device 700 may include one or more additional processor(s) 722 (e.g., one or more DSPs). The processor 716 may include the scheduler 104, the arbiter 106, or both. In a particular aspect, the processor 102 of FIG. 1 corresponds to the processor 716, the processor(s) 722, or a combination thereof. In a particular aspect, the processor 716 is coupled to the scoreboard 114.

The device 700 may include a memory 702 and a CODEC 712. The memory 702 may include instructions 718 that are executable by the one or more additional processor(s) 722 (or the processor 716) to implement one or more operations described with reference to FIGS. 1-6. In an example, the memory 702 corresponds to the memory 134 of FIG. 1 and includes a computer-readable storage device that stores the instructions 718. The instructions 718, when executed by one or more processors (e.g., the processor 102, the processor 716, or the processor(s) 722, as illustrative examples), cause the one or more processors to retrieve a first memory access instruction from an instruction buffer. The first memory access instruction indicates a first address range of a first memory access operation. The instructions 718, when executed by the one or more processors, also cause the one or more processors to add an indication of the first memory access instruction to a first scoreboard entry of a plurality of scoreboard entries of the scoreboard. The instructions 718, when executed by the one or more processors, further cause the one or more processors to, based on determining that the first address range at least partially overlaps a second address range associated with a second scoreboard entry of the plurality of scoreboard entries that corresponds to a second memory access instruction, sets an element of a dependency matrix to have a has-dependency value indicating dependency of the first scoreboard entry on the second scoreboard entry.

The device 700 may include a wireless controller 726 coupled, via a transceiver 724, to an antenna 734. The device 700 may include a display 704 coupled to a display controller 706. Speaker(s) 714 and microphone(s) 708 may be coupled to the CODEC 712. The CODEC 712 may include a digital-to-analog converter (DAC 728) and an analog-to-digital converter (ADC 730). In a particular implementation, the CODEC 712 may receive analog signals from the microphone(s) 708, convert the analog signals to digital signals using the ADC 730, and provide the digital signals to the processor(s) 722. The processor(s) 722 (e.g., a speech and music CODEC) may process the digital signals. In a particular implementation, the processor(s) 722 (e.g., the speech and music CODEC) may provide digital signals to the CODEC 712. The CODEC 712 may convert the digital signals to analog signals using the DAC 728 and may provide the analog signals to the speaker(s) 714. The device 700 may include an input device 720.

In a particular implementation, the device 700 may be included in a system-in-package or system-on-chip device 732. In a particular implementation, the memory 702, the processor 716, the processor(s) 722, the scoreboard 114, the display controller 706, the CODEC 712, the wireless controller 726, and the transceiver 724 are included in the system-in-package or system-on-chip device 732. In a particular implementation, the input device 720 and a power supply 710 are coupled to the system-in-package or system-on-chip device 732. Moreover, in a particular implementation, as illustrated in FIG. 7, the display 704, the input device 720, the speaker(s) 714, the microphone(s) 708, the antenna 734, and the power supply 710 are external to the system-in-package or system-on-chip device 732. In a particular implementation, each of the display 704, the input device 720, the speaker(s) 714, the microphone(s) 708, the antenna 734, and the power supply 710 may be coupled to a component of the system-in-package or system-on-chip device 732, such as an interface or a controller.

The device 700 may include a voice activated device, an audio device, a wireless speaker and voice activated device, a portable electronic device, a car, a vehicle, a computing device, a communication device, an internet-of-things (IoT) device, a virtual reality (VR) device, a smart speaker, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a home automation system, a wireless speaker and voice activated device, a base station, or any combination thereof. In a particular aspect, the processor 716, the processor(s) 722, or a combination thereof, are included in an integrated circuit.

In conjunction with the described systems and methods, an apparatus for memory access management is disclosed that includes means for retrieving a first memory access instruction from an instruction buffer. In some implementations, the means for retrieving includes the processor 102, the processor 716, the processor(s) 722, one or more other circuits or devices configured to retrieve a memory access instruction from an instruction buffer, or a combination thereof. The first memory access instruction indicates a first address range of a first memory access operation.

The apparatus also includes means for adding an indication of the first memory access instruction to a first scoreboard entry of a plurality of scoreboard entries of a scoreboard. For example, the means for adding includes the scheduler 104, the processor 102, the processor 716, the processor(s) 722, one or more other circuits or devices configured to add an indication of a memory access instruction to a scoreboard entry, or a combination thereof.

The apparatus further includes means for setting an element of a dependency matrix to have a has-dependency value indicating a dependency of the first scoreboard entry on a second scoreboard entry of the plurality of scoreboard entries. For example, the means for setting the element of the dependency matrix includes the scheduler 104, the range testing circuit 132, the processor 102, the processor 716, the processor(s) 722, one or more other circuits or devices configured to set an element of a dependency matrix, or a combination thereof. The element is set to have the has-dependency value based on determining that the first address range at least partially overlaps a second address range associated with the second scoreboard entry.

In a particular aspect, the apparatus also includes means for updating the dependency matrix to remove any dependencies on the second scoreboard entry. For example, the means for updating the dependency matrix includes the scheduler 104, the range testing circuit 132, the processor 102, the processor 716, the processor(s) 722, one or more other circuits or devices configured to update the dependency matrix, or a combination thereof. The dependency matrix is updated subsequent to execution of a second memory access instruction corresponding to the second scoreboard entry.

In a particular aspect, the apparatus further includes means for updating a validity indicator to mark the second scoreboard entry as available. For example, the means for updating the validity indicator includes the scheduler 104, the processor 102, the processor 716, the processor(s) 722, one or more other circuits or devices configured to update the validity indicator, or a combination thereof.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-7. In some implementations, part or all of one or more of the operations or methods of FIGS. 1-7 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device comprising:
    a scoreboard comprising:
        a plurality of scoreboard entries configured to store information regarding one or more uncompleted memory access operations; and
        a dependency matrix configured to store dependency information corresponding to the plurality of scoreboard entries; and
    a processor configured to:
        retrieve a first memory access instruction from an instruction buffer, the first memory access instruction indicating a first address range of a first memory access operation;
        add an indication of the first memory access instruction to a first scoreboard entry of the plurality of scoreboard entries; and
        based on determining that the first address range at least partially overlaps a second address range associated with a second scoreboard entry of the plurality of scoreboard entries that corresponds to a second memory access instruction, that the first memory access instruction corresponds to a write access instruction, and that the second memory access instruction corresponds to a read access instruction, set an element of the dependency matrix to have a has-dependency value indicating a dependency of the first scoreboard entry on the second scoreboard entry.

2. The device of claim 1, wherein the first memory access operation is stalled until the dependency of the first scoreboard entry on the second scoreboard entry is resolved.

3. The device of claim 1, further comprising a ready buffer configured to store information regarding a plurality of memory access instructions that are available for execution in any order, wherein the processor is further configured to:
    determine, based on the dependency matrix, whether the second scoreboard entry has a dependency on any other scoreboard entry of the plurality of scoreboard entries; and
    based on determining that the second scoreboard entry does not have a dependency on any other scoreboard entry, add an indication of the second memory access instruction to the ready buffer.

4. The device of claim 3, wherein the processor is further configured to:
    retrieve, based on a memory access arbitration technique, the indication of the second memory access instruction from the ready buffer; and
    initiate execution of the second memory access instruction.

5. The device of claim 1, wherein the processor is further configured to, subsequent to execution of the second memory access instruction:
    update the dependency matrix to remove any dependencies on the second scoreboard entry; and
    update a validity indicator to mark the second scoreboard entry as available.

6. The device of claim 1, wherein the processor is configured to, in response to at least one of determining that a first start address of the first address range is greater than or equal to a second start address of the second address range and the first start address is less than a second end address of the second address range or determining that a first end address of the first address range is greater than the second start address and the first end address is less than or equal to the second end address, determine that the first address range at least partially overlaps the second address range.

7. The device of claim 1, wherein the processor is configured to, in response to at least one of determining that a second start address of the second address range is greater than or equal to a first start address of the first address range and the second start address is less than a first end address of the first address range or determining that a second end address of the second address range is greater than the first start address and the second end address is less than or equal to the first end address, determine that the first address range at least partially overlaps the second address range.

8. The device of claim 1, wherein the scoreboard further includes a range testing circuit, and wherein the processor is configured to:
    provide, to the range testing circuit, a first indication of the first scoreboard entry and a second indication of the second scoreboard entry; and
    based on receiving an overlap indication from the range testing circuit, determine that the first address range at least partially overlaps the second address range.

9. The device of claim 1, wherein the processor is further configured to, in response to determining that the first scoreboard entry has no dependency on any of the plurality of scoreboard entries, add an indication of the first memory access instruction to a ready buffer.

10. The device of claim 1, wherein the dependency matrix includes a plurality of rows and a plurality of columns.

11. A method of memory access management comprising:
    retrieving, at a device, a first memory access instruction from an instruction buffer, the first memory access instruction indicating a first address range of a first memory access operation;
    adding, by the device, an indication of the first memory access instruction to a first scoreboard entry of a plurality of scoreboard entries of a scoreboard; and
    based on determining that the first address range at least partially overlaps a second address range associated with a second scoreboard entry of the plurality of scoreboard entries that corresponds to a second memory access instruction, that the first memory access instruction corresponds to a write access instruction, and that the second memory access instruction corresponds to a read access instruction, setting an element of a dependency matrix to have a has-dependency value indicating a dependency of the first scoreboard entry on the second scoreboard entry.

12. The method of claim 11, further comprising:
    determining, based on the dependency matrix, whether the second scoreboard entry has a dependency on any other scoreboard entry of the plurality of scoreboard entries; and
    based on determining that the second scoreboard entry does not have a dependency on any other scoreboard entry, adding an indication of the second memory access instruction to a ready buffer.

13. The method of claim 12, further comprising:
    retrieving, based on a memory access arbitration technique, the indication of the second memory access instruction from the ready buffer; and
    initiating, at the device, execution of the second memory access instruction.

14. The method of claim 11, further comprising, subsequent to execution of the second memory access instruction:
    updating, at the device, the dependency matrix to remove any dependencies on the second scoreboard entry; and
    updating, by the device, a validity indicator to mark the second scoreboard entry as available.

15. The method of claim 11, further comprising, in response to at least one of determining that a first start address of the first address range is greater than or equal to a second start address of the second address range and the first start address is less than a second end address of the second address range or determining that a first end address of the first address range is greater than the second start address and the first end address is less than or equal to the second end address, determining that the first address range at least partially overlaps the second address range.

16. The method of claim 11, further comprising, in response to at least one of determining that a second start address of the second address range is greater than or equal to a first start address of the first address range and the second start address is less than a first end address of the first address range or determining that a second end address of the second address range is greater than the first start address and the second end address is less than or equal to the first end address, determine that the first address range at least partially overlaps the second address range.

17. The method of claim 11, further comprising:
    providing, to a range testing circuit of the scoreboard, a first indication of the first scoreboard entry and a second indication of the second scoreboard entry; and
    based on receiving an overlap indication from the range testing circuit, determining that the first address range at least partially overlaps the second address range.

18. The method of claim 11, further comprising, in response to determining that the first scoreboard entry has no dependency on any of the plurality of scoreboard entries, adding an indication of the first memory access instruction to a ready buffer.

19. The method of claim 11, wherein the first memory access operation includes a read operation or a write operation.

20. A non-transitory computer-readable storage medium storing instructions that, when executed by a processor, cause the processor to:
    retrieve a first memory access instruction from an instruction buffer, the first memory access instruction indicating a first address range of a first memory access operation;
    add an indication of the first memory access instruction to a first scoreboard entry of a plurality of scoreboard entries of a scoreboard; and
    based on determining that the first address range at least partially overlaps a second address range associated with a second scoreboard entry of the plurality of scoreboard entries that corresponds to a second memory access instruction, that the first memory access instruction corresponds to a write access instruction, and that the second memory access instruction corresponds to a read access instruction, set an element of a dependency matrix to have a has-dependency value indicating a dependency of the first scoreboard entry on the second scoreboard entry.

21. The non-transitory computer-readable storage medium of claim 20, wherein the instructions, when executed by the processor, further cause the processor to:
    determine, based on the dependency matrix, whether the second scoreboard entry has a dependency on any other scoreboard entry of the plurality of scoreboard entries; and
    based on determining that the second scoreboard entry does not have a dependency on any other scoreboard entry, add an indication of the second memory access instruction to a ready buffer.

22. The non-transitory computer-readable storage medium of claim 21, wherein the instructions, when executed by the processor, further cause the processor to:
    retrieve, based on a memory access arbitration technique, the indication of the second memory access instruction from the ready buffer; and
    initiate execution of the second memory access instruction.

23. The non-transitory computer-readable storage medium of claim 20, wherein the instructions, when executed by the processor, further cause the processor to, subsequent to execution of the second memory access instruction:
    update the dependency matrix to remove any dependencies on the second scoreboard entry; and
    update a validity indicator to mark the second scoreboard entry as available.

24. The non-transitory computer-readable storage medium of claim 20, wherein the instructions, when executed by the processor, further cause the processor to, in response to at least one of determining that a first start address of the first address range is greater than or equal to a second start address of the second address range and the first start address is less than a second end address of the second address range or determining that a first end address of the first address range is greater than the second start address and the first end address is less than or equal to the second end address, determine that the first address range at least partially overlaps the second address range.

25. The non-transitory computer-readable storage medium of claim 20, wherein the instructions, when executed by the processor, further cause the processor to, in response to at least one of determining that a second start address of the second address range is greater than or equal to a first start address of the first address range and the second start address is less than a first end address of the first address range or determining that a second end address of the second address range is greater than the first start address and the second end address is less than or equal to the first end address, determine that the first address range at least partially overlaps the second address range.

26. The non-transitory computer-readable storage medium of claim 20, wherein the instructions, when executed by the processor, further cause the processor to:

provide, to a range testing circuit, a first indication of the first scoreboard entry and a second indication of the second scoreboard entry; and based on receiving an overlap indication from the range testing circuit, determine that the first address range at least partially overlaps the second address range.

27. The non-transitory computer-readable storage medium of claim 20, wherein the instructions, when executed by the processor, further cause the processor to, in response to determining that the first scoreboard entry has no dependency on any of the plurality of scoreboard entries, add an indication of the first memory access instruction to a ready buffer.

28. An apparatus comprising:
  means for retrieving a first memory access instruction from an instruction buffer, the first memory access instruction indicating a first address range of a first memory access operation;
  means for adding an indication of the first memory access instruction to a first scoreboard entry of a plurality of scoreboard entries of a scoreboard; and
  means for setting an element of a dependency matrix to have a has-dependency value indicating a dependency of the first scoreboard entry on a second scoreboard entry of the plurality of scoreboard entries, the element set to have the has-dependency value based on determining that the first address range at least partially overlaps a second address range associated with the second scoreboard entry that corresponds to a second memory access instruction, that the first memory access instruction corresponds to a write access instruction, and that the second memory access instruction corresponds to a read access instruction.

29. The apparatus of claim 28, wherein the means for retrieving, the means for adding, and the means for setting are integrated into at least one of a home automation system, a voice-activated device, a wireless speaker and voice activated device, a portable electronic device, a car, a vehicle, a computing device, a communication device, an internet-of-things (IoT) device, a virtual reality (VR) device, a base station, a mobile device, or a combination thereof.

30. The apparatus of claim 28, further comprising:
  means for updating the dependency matrix to remove any dependencies on the second scoreboard entry, the dependency matrix updated subsequent to execution of the second memory access instruction corresponding to the second scoreboard entry; and
  means for updating a validity indicator to mark the second scoreboard entry as available.

* * * * *